Oct. 14, 1969  D. M. McMAKIN  3,472,001
GAS INTAKE DEVICE
Filed Nov. 1, 1967
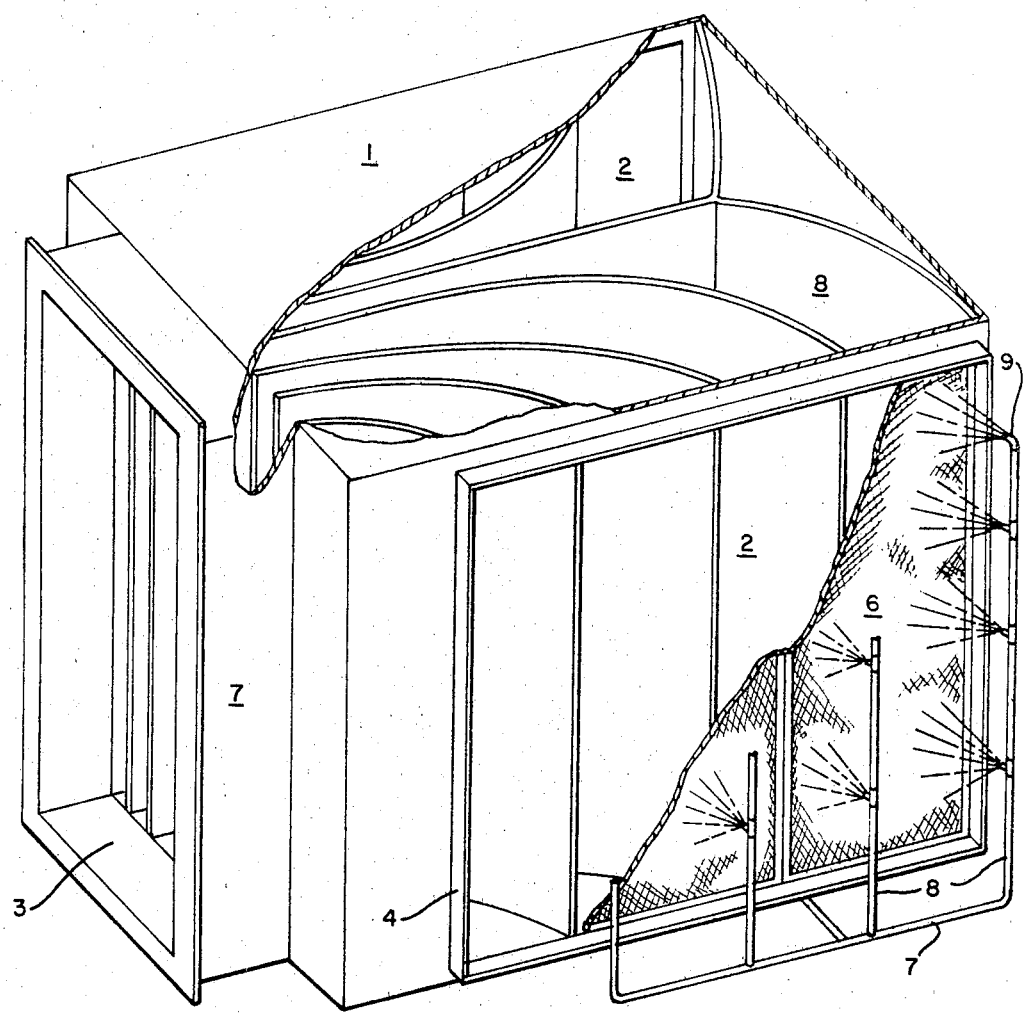
INVENTOR.
DWIGHT M. McMAKIN
BY *Edward M. Steutemann*
ATTORNEY Patented Oct. 14, 1969

3,472,001
GAS INTAKE DEVICE
Dwight M. McMakin, Louisville, Ky., assignor to American Air Filter Company, Inc., Louisville, Ky., a corporation of Delaware
Filed Nov. 1, 1967, Ser. No. 679,881
Int. Cl. B01d 46/42
U.S. Cl. 55—233       2 Claims

ABSTRACT OF THE DISCLOSURE

A sound suppressing gas filtering air intake arrangement for a gas compressor device which can include evaporative cooling and filter means at the outlet of the device to form sound suppressing flow channels within the intake device.

BACKGROUND OF THE INVENTION

Gas compression devices, for example vaneaxial compressors or centrifugal compressors, are very compact, relatively inexpensive, and are capable of handling extremely large quantities of gas, for example air. Unfortunately, such compression devices are extremely noisy and, without modification, are therefore unacceptable for certain applications. In such applications, where noise level must be controlled within certain limits, noise suppressing means are provided at the air inlet to the compressor to eliminate or greatly reduce the noise normally emitted from the compresor intake but in previous apparatus the gas velocity through the sound suppressing means has been very high.

In certain applications the quality of the gas provided by the compressor must be controlled within specific limits. Where it is desired to control the amount of particulate matter carried by the compressed air stream emitted from the compressor, and the air supplied to the compressor intake carries relatively large quantities of particulate matter, it is necesary to provide means to clean the air stream. If the particulate matter is corrosive or abrasive compressor efficiency and compressor life are, advantageously, improved by providing such cleaning means upstream of the compresor air intake. In some applications the inlet device can include an air washer evaporative cooling means to cool the air stream before admission to the compressor.

Since such compressors normally supply large quantities of air, the pressure loss incurred by the air stream passing through the air intake means must be minimized because even a very small increase in pressure drop represents a significant loss of capacity and/or increase in power requirements.

SUMMARY OF THE INVENTION

The present invention provides a noise suppressing gas cleaning intake means for a gas compression device which, advantageously, provides means to remove particulate matter from the intake gas stream and likewise can provide means to cool the gas stream supplied to the compressor means. Furthermore, the present invention provides a gas intake means having internal air guide means to suppress noise normally emitted from centrifugal or other gas compressing devices where the guide means are disposed to minimize restriction to air flow and therefore do not significantly increase the pressure drop incurred by the gas stream passing through the intake device.

Various other feautres of the present invention will become obvious to those skilled in the art upon reading the disclosure set forth hereinafter.

More particularly, the present invention provides a noise suppressing gas cleaning intake means for a gas compressor comprising: a casing including cooperatively connected, opposed, peripheral side walls to define an air intake chamber, at least one side wall having a gas inlet aperture and one side wall having a gas outlet aperture; curved gas baffle means extending between the intake aperture and the outlet aperture to prevent line of sight therebetween; and, porous media means at the air inlet aperture to remove particulate matter from gas admitted to said intake chamber and can provide cooling fluid distribution means to distribute cooling fluid over the media.

It is to be understood that the description of the example of the apparatus in accordance with the present invention given hereinafter is not by way of limitation and that various changes can be made in the arrangement, form, or configuration of the apparatus without departing from the scope or spirit of the present invention.

Referring to the drawing which shows one example of an apparatus in accordance with the present invention a gas intake chamber, for example an air intake chamber for a compressor, is defined by generally rectangular casing 1.

In the example of the figure, opposed walls of casing 1 including intake apertures 2 to provide separated air intake means and an air outlet aperture 3 is provided in the wall intermediate air inlets 2.

In accordance with one feature of the example of the present invention as shown in the figure, porous gas cleaning means 6 are provided in cooperative relation with intake apertures 2 to remove particulate matter from the air stream admitted to the intake device. In the example of the figure, a peripheral frame 4 is provided around inlet aperture 2 and is adapted to support media pads 6 which can, for example, be of woven wire or expanded fiberglass and can be periodically renewed or cleaned.

A gas intake device as shown in the figure is provided to supply a gas stream to an associated compressing device and includes a peripheral flange 7 which can be adapted to fasten the intake device to the associated gas compressing means.

In accordance with another feature of the present invention noise suppressing air guide vanes 8 are provided within the chamber defined by casing 1. Vanes 8 can be, at least in part, of sound absorbing construction where part of the sound absorbing surface is located in the curved portion of the vane in direct line with the sound waves emitted from the compressor. As shown, the vanes extend substantially from inlet apertures 2 to outlet 3 and are curved to provide smooth air flow channels between the inlets and the outlet. In accordance with one feature of the present invention, it has been recognized that the curvature of the vanes should be sufficient to prevent line of sight from inlet 2 to outlet 3 so the number of vanes to be provided in casing 1, and the spacing between vanes, is a function of the degree of curvature of the vanes. That is with fewer vanes and greater spacing between adjacent vanes it is necessary to provide a greater degree of curvature to prevent line of sight whereas with an increased number of vanes and decreased spacing between adjacent vanes the degree of curvature can be correspondingly diminished.

Objectionable high frequency sound waves of the type emitted from gas compressing means travel in a straight line and by providing vanes 8 in the aforesaid relationship to prevent line of sight between the inlet and the outlet of the devices the high frequency sound waves are not emitted from the intake chamber but are reflected several times and absorbed by the sound absorbing surfaces of vanes 8. The reflection and deflection of high frequency sound waves from the surfaces of vanes 8 results in destructive interference between the waves and elimination of the objectionable noise and sound waves which are not cancelled by the interference are absorbed by vanes 8. In some instances the sound absorbing surfaces of vanes 8 are of a perforated construction to absorb the waves and reduce the probability of emission of noise from intake chamber 1.

Vanes 8, as shown, extend susbtantially from intake 2 to outlet 3. Some degree of turbulence occurs in the air stream as it passes from the inlet to the outlet of chamber 2 and it has been recognized that vanes 8 can be extended downstream from outlet 3 in generally parallel relationship to provide air flow straightening means to reduce the turbulence of the air stream before admission to the associated gas compressor.

In some applications it is desirable to cool the inlet air and, as shown in the figure, the air cleaning or filtering device can include liquid distribution means to spray cooling liquid on the media pads and cool the air stream admitted to casing 1 by evaporation of the liquid. Apparatus in accordance with the present invention can include different types of air cleaning devices and the example of the figure shows a straightforward apparatus which includes a liquid manifold 7 to supply cooling liquid to distributors which include nozzles 9 to distribute the liquid uniformly over the surface of media pads 6. In such apparatus drain means, not shown, can be provided to eliminate the liquid which drains from pads 6. The liquid spray apparatus as shown can be provided to be operated continuously or intermittently as desired.

It will be noted that the example of a gas intake device as shown in the figure provides two gas intake apertures and an outlet aperture in the wall intermediate the inlet apertures. This construction advantageously provides compact efficient arrangement of vanes 8 in casing 1 and likewise reduces the velocity of gas flow through the gas cleaning medium to reduce the pressure drop which would be incurred if only one gas inlet 2 was provided.

The invention claimed is:

1. A noise suppressing gas cleaning intake means for gas compressor comprising: a casing of generally rectangular cross-section having a top wall, a bottom wall, opposed end walls, and opposed side walls extending from said top wall to said bottom wall, each side wall has gas inlet aperture means, one one end wall having a gas outlet aperture means; means for directing gas from said gas inlet aperture means to said gas outlet aperture means comprising spaced curved, fixed turning vanes extending from said top wall to said bottom wall and from each said side wall at each of said gas inlet aperture means to said one end wall at said gas outlet aperture means to form gas flow channels therebetween, each vane gradually curving from the gas inlet aperture means to the gas outlet aperture means; each channel conveying from the gas inlet aperture means to the gas outlet means and comprising a plurality of said turning vanes and having gas inlet and gas outlet defined by the ends of adjacent vanes and, means supporting porous media pads disposed across each said gas inlet aperture means.

2. The apparatus of claim 1 including liquid distributor means to distribute liquid over the surface of said media pads to cool the stream of air passing therethrough.

References Cited

UNITED STATES PATENTS

| | | | |
|---|---|---|---|
| 1,966,787 | 7/1934 | Buri | 230—232 |
| 2,091,019 | 8/1937 | Smith | 62—262 |
| 2,112,608 | 3/1938 | Schmidt | 181—46 |
| 2,161,027 | 6/1939 | Dollinger | 55—276 |
| 2,198,305 | 4/1940 | Crawford | 261—97 |
| 2,381,705 | 8/1945 | Vokes | 55—306 |
| 2,407,194 | 9/1946 | Vokes | 55—306 |
| 2,588,612 | 3/1952 | Brookins | 261—97 |
| 3,069,848 | 12/1962 | Griffith | 181—33.21 |
| 3,352,778 | 11/1967 | Brink et al. | 55—185 |
| 3,279,883 | 10/1966 | Thompson et al. | |

HARRY B. THORNTON, Primary Examiner

B. NOZICK, Assistant Examiner

U.S. Cl. X.R.

55—267, 276, 416, 419, 484; 181—46, 50; 230—232; 261—95